US012790226B2

(12) United States Patent
Lee et al.

(10) Patent No.: US 12,790,226 B2
(45) Date of Patent: Nov. 10, 2026

(54) METHOD FOR RECOVERING MAGNESIUM FROM BY-PRODUCTS OF ELECTROLYTIC CHLORINE GENERATION SYSTEM

(71) Applicant: Puricyclesolution Co., Ltd., Chuncheon-si (KR)

(72) Inventors: Yong Gu Lee, Chuncheon-si (KR); Hee Joong Kim, Seoul (KR)

(73) Assignee: Puricyclesolution Co., Ltd., Chuncheon-si Gangwon-do (KR)

( * ) Notice: Subject to any disclaimer, the term of this patent is extended or adjusted under 35 U.S.C. 154(b) by 436 days.

(21) Appl. No.: 18/539,486

(22) Filed: Jan. 3, 2024

(65) Prior Publication Data

US 2025/0100895 A1 Mar. 27, 2025

(30) Foreign Application Priority Data

Sep. 25, 2023 (KR) ........................ 10-2023-0128131

(51) Int. Cl.
*C01F 5/06* (2006.01)

(52) U.S. Cl.
CPC ............ *C01F 5/06* (2013.01); *C01P 2002/72* (2013.01)

(58) Field of Classification Search
None
See application file for complete search history.

(56) References Cited

U.S. PATENT DOCUMENTS

| | | | | |
|---|---|---|---|---|
| 3,615,201 A * | 10/1971 | Cesca | C08K 3/22 | 423/637 |
| 2003/0080066 A1 | 5/2003 | Vohra et al. | | |
| 2012/0189850 A1 * | 7/2012 | Ohsaki | C01F 5/08 | 428/402 |

FOREIGN PATENT DOCUMENTS

| | | |
|---|---|---|
| JP | 2009525253 A | 7/2009 |
| KR | 101561925 B1 | 10/2015 |
| KR | 1020230108694 A | 7/2023 |

OTHER PUBLICATIONS

Korean Office Action for KR 10-2023-0128131 issued on Mar. 29, 2024.

* cited by examiner

*Primary Examiner* — Stefanie J Cohen
(74) *Attorney, Agent, or Firm* — Dinsmore & Shohl LLP; Yongsok Choi, Esq.

(57) ABSTRACT

Disclosed is a method for recovering magnesium from by-products generated in an electrolytic chlorine generation system. According to one aspect of the present disclosure, there is provided a method for recovering magnesium from by-products generated in an electrolytic chlorine generation system, the method including: receiving and drying the by-products in a preset first environment; and calcining the dried by-products in a preset second environment.

3 Claims, 6 Drawing Sheets

METHOD FOR RECOVERING MAGNESIUM FROM BY-PRODUCTS OF ELECTROLYTIC CHLORINE GENERATION SYSTEM

CROSS-REFERENCE TO RELATED APPLICATIONS

This application claims priority to Korean Patent Application No. 10-2023-0128131 filed on Sep. 25, 2023, the entire contents of which are herein incorporated by reference.

BACKGROUND

1. Technical Field

The present disclosure relates to a method for recovering magnesium oxide (MgO) from precipitation by-products generated in an electrolytic chlorine generation system.

2. Related Art

Description provided in this section simply provides background information for the present embodiment and does not constitute prior art.

Magnesium oxide (MgO) is an important resource used in various applications including fields of refractory industry, agriculture, pharmaceuticals, chemicals, semiconductors, environment and construction. Magnesium oxide is mostly processed from naturally occurring minerals, however, about 14% of the world's magnesium oxide supply is produced synthetically from seawater or brine.

Magnesium oxide currently consumed domestically is mostly natural sintered magnesium oxide, and is highly dependent on magnesite-based raw materials from China. However, the influence of supply and demand restrictions caused by each country's environmental policy causes price increases and supply instability for natural mineral raw materials.

As a way to avoid such dependence on natural magnesia raw materials, technology for synthesizing magnesia from seawater or brine as described above has received attention.

Magnesium oxide synthesized from seawater or brine is reported to have more superior purity and reactivity compared to magnesium oxide processed from minerals. Methods for recovering magnesium from seawater include precipitation using alkaline substances, use of an ion exchange resin, a solvent extraction method and the like. Particularly, studies on recovering magnesium using alkaline precipitants have been much undertaken.

Precipitants mainly used for recovering magnesium include lime, dolomite, NaOH, KOH $NH_4OH$ and the like, and the precipitation method generally requires removal of calcium before precipitating magnesium. The biggest difficulty in existing magnesium recovery using an alkaline precipitant is precipitating and filtering produced magnesium hydroxide, and selectively removing calcium.

Particularly, as for technology for separating and recovering magnesium from seawater, studies recovering magnesium in the form of magnesium hydroxide by adding NaOH to seawater dominate, and studies separating magnesium in the form of a magnesium salt by adding an acid have also been performed. However, there are still limitations in terms of low recovery rate and consuming a large amount of chemicals.

Technology for producing magnesium oxide by removing calcium, an impurity, from seawater and extracting only a large amount of magnesium has already been commercialized globally, however, it is difficult to secure economic efficiency, and development of highly efficient and economical extraction technology is still required. Particularly, economic efficiency related to costs consumed on non-reusable chemicals including alkaline precipitants such as NaOH and $NH_4OH$ is considered as a major obstacle to technology commercialization.

Accordingly, there is a need for development of economical and efficient technology capable of, without requiring excessive chemicals, reducing the content of impurities and recovering high purity magnesium oxide.

SUMMARY

One embodiment of the present disclosure is directed to providing a method for recovering magnesium oxide without separate chemical treatment using precipitation by-products generated in a seawater or brine-based electrolytic chlorine generation system.

According to one aspect of the present disclosure, there is provided a method for recovering magnesium from by-products generated in an electrolytic chlorine generation system, the method including: receiving by-products from an electrolytic chlorine generation system and drying the by-products in a preset first environment; and calcining the dried by-products in a preset second environment.

According to one aspect of the present disclosure, purity of the magnesium recovered through the calcining is at least 94% or higher.

According to one aspect of the present disclosure, the magnesium recovered through the calcining is magnesium oxide (MgO).

According to one aspect of the present disclosure, the method further includes washing the by-products, and the washing of the by-products is performed prior to the drying.

According to one aspect of the present disclosure, the magnesium recovered through the calcining is magnesium oxide (MgO), and purity of the magnesium oxide is at least 99% or higher.

According to one aspect of the present disclosure, the first environment in which the drying is performed is maintained at a temperature of 80° C. to 120° C. for 1 hour to 12 hours.

According to one aspect of the present disclosure, the second environment in which the calcining is performed is maintained at a temperature of 550° C. to 600° C. for 0.5 hours to 1 hour.

According to one aspect of the present disclosure, there is provided a magnesium compound recovered using the method for recovering magnesium from by-products generated in an electrolytic chlorine generation system.

According to one aspect of the present disclosure, the magnesium compound is magnesium oxide (MgO) and has purity of 90% or higher.

As described above, according to one aspect of the present disclosure, there is provided a method for recovering magnesium from by-products generated in an electrolytic chlorine generation system, and a magnesium compound having purity of 90% or higher can be recovered through a calcination process only without using chemicals at all, which is advantageous in improving economic efficiency by reducing costs required for using a large amount of chemicals consumed in the magnesium synthesis/processing process and disposing the chemicals after use.

In addition, while simplifying the process for recovering magnesium oxide from electrolysis by-products, a high recovery rate can be maintained compared to existing chemical extraction methods, and therefore, process efficiency is improved, and industrial waste is treated at the same time. As a result, there are advantages in that magnesium, a useful resource, can be recovered while reducing the amount of waste generated.

DETAILED DESCRIPTION

Figure 1:
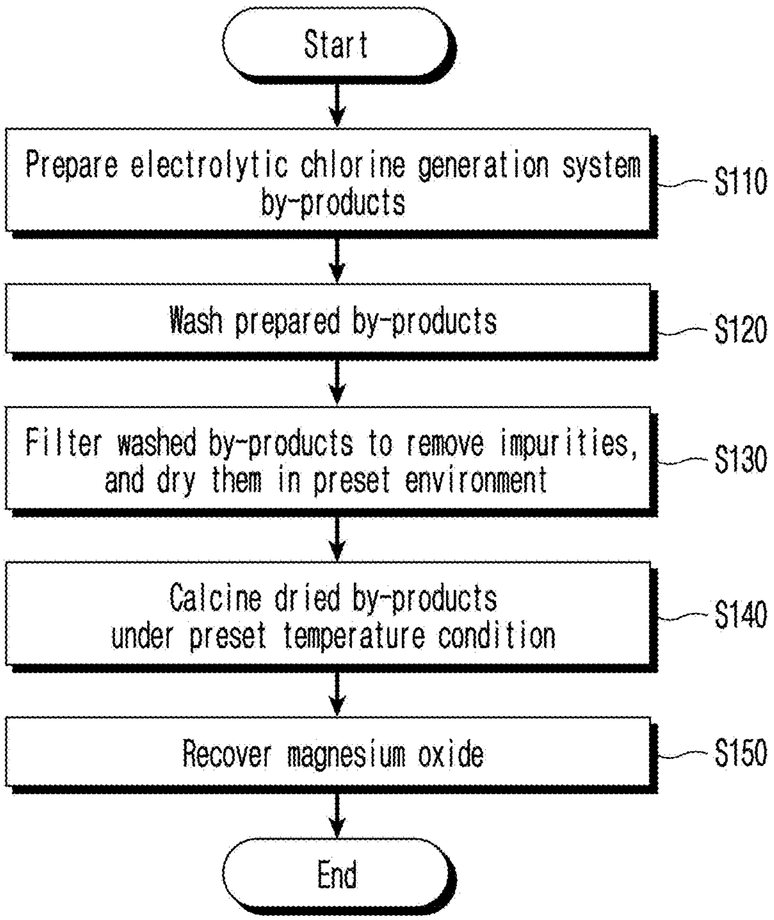
FIG. 1 is a flowchart illustrating a method for recovering magnesium oxide from by-products of an electrolytic chlorine generation system according to one embodiment of the present disclosure.

Since the present disclosure may make various changes and have various embodiments, specific embodiments will be illustrated in the drawings and described in detail. However, this is not to limit the present disclosure to specific embodiments, and it needs to be understood to include all changes, equivalents and substitutes included in idea and technical scope of the present disclosure. In describing each drawing, like reference numerals are used for like constituents.

Terms such as first, second, A and B may be used to describe various constituents, however, the constituents should not be limited by the terms. The terms are used only for the purpose of distinguishing one constituent from another constituent. For example, without departing from the scope of right of the present disclosure, a first constituent may be named a second constituent, and similarly, a second constituent may also be named a first constituent. A term and/or includes a combination of a plurality of related described items or any of a plurality of related described items.

When a certain constituent is said to be "linked" or "connected" to another constituent, it needs to be understood that the certain constituent may be directly linked or connected to the another constituent, but other constituents may also be present in between. On the other hand, when a certain constituent is said to be "directly linked" or "directly connected" to another constituent, it needs to be understood that other constituents are not present in between.

Terms used in the present application are only used for describing specific embodiments, and are not intended to limit the present disclosure. Singular expressions include plural expressions unless the context clearly indicates otherwise. In the present application, terms such as "include" or "have" need to be understood as not excluding the possibility of presence or addition of features, numbers, steps, operations, constituents, components or combinations thereof described in the specification in advance.

Unless otherwise defined, all terms used herein including technical or scientific terms have the same meanings generally understood by those skilled in the art.

Terms defined in generally used dictionaries need to be interpreted as having a meaning consistent with the meaning in the context of related technology, and are not interpreted in an ideally or excessively formal meaning unless explicitly defined in the present application.

In addition, each constitution, process, method or the like included in each embodiment of the present disclosure may be shared within the scope of not being technically contradictory to each other.

FIG. 1 is a flowchart illustrating a method for recovering magnesium oxide from by-products of an electrolytic chlorine generation system according to one embodiment of the present disclosure.

An electrolytic chlorine generation system is generally used for producing chlorine in an on-site manufacturing manner, and produces sodium hypochlorite from brine using an electrolysis tank. The electrolytic chlorine generation system does not have problems in handling and transporting chlorine, a toxic gas, and is either used to remove fouling organisms inside a cooling water pipe in order to use seawater as cooling water in thermal power plants or nuclear power plants, or mainly used for sterilizing ship ballast water, disinfection in water purification plants, sterilization devices in sewage treatment plants, swimming pools and the like.

Such an on-site manufacturing-type electrolytic chlorine generation system mainly uses seawater or brackish water, and brine solutions such as artificial brine. When using seawater, brackish water or the like, a large amount of cations such as calcium ($Ca^{2+}$) and magnesium ($Mg^{2+}$) included in the water are formed as precipitates during the electrolysis process, forming solid waste. As a result, high concentration of magnesium is discarded while being included in by-products, resulting in the loss of magnesium resources in seawater.

Accordingly, the recovery method of the present disclosure can reduce the amount of industrial waste generated by using by-products generated from an on-site manufacturing-type electrolytic chlorine generation system. In addition, magnesium oxide with high purity may be recovered while significantly reducing the amount of chemicals used compared to existing magnesium oxide recovering methods.

In order to recover magnesium oxide, by-products generated in an electrolytic chlorine generation system are prepared (S110).

As one example, the electrolytic chlorine generation system of the present disclosure may be an on-site manufacturing-type electrolytic chlorine generation system using seawater or brackish water. Results of analyzing components of the by-products generated therefrom (hereinafter, abbreviated as 'electrolysis by-products') are summarized in Table 1.

TABLE 1

| Element | Na | Mg | Si | Ca | S | Cl |
|---|---|---|---|---|---|---|
| Content (wt %) | 0.3 | 69.5 | 0.6 | 5.1 | 0.5 | 4.2 |

Table 1 shows results of analyzing constituent elements of the precipitate-type electrolysis by-products using X-ray fluorescence spectroscopy (XRF). It can be identified that the electrolysis by-products discharged from the electrolytic chlorine generation system are magnesium (Mg, 69.5 wt %), and in addition thereto, calcium (Ca), silicon (Si) and the like are included as major components.

In addition, results of analyzing the electrolysis by-products using energy dispersive X-ray spectroscopy (EDX) are summarized in Table 2.

The results of EDX analysis indicate that the electrolysis by-products include oxygen (45.99 at %) and magnesium (44.38 at %) as major components. From the results described above, it can be seen that the main substance included in the electrolysis by-products is magnesium hydroxide ($Mg(OH)_2$).

TABLE 2

| | Composition Ratio | |
|---|---|---|
| Element | Weight % | Atomic % |
| O | 34.41 | 45.99 |
| Na | 0.44 | 0.41 |
| Mg | 50.46 | 44.38 |
| Si | 0.35 | 0.26 |
| S | 4.68 | 3.12 |
| Cl | 9.00 | 5.42 |
| Ca | 0.67 | 0.41 |
| Total | 100.00 | 100.00 |

The prepared electrolysis by-products are washed (S120).

As presented in Tables 1 and 2, a main component included in the electrolysis by-products is magnesium (Mg), and it is present in the form of magnesium hydroxide ($Mg(OH)_2$). Accordingly, when the electrolysis by-products are used as a raw material for recovering magnesium oxide, precipitants and additional chemicals are not required for magnesium hydroxide synthesis.

However, since various impurities other than magnesium hydroxide are present in the electrolysis by-products, removal of the impurities present in the electrolysis by-products needs to be accompanied in order to improve purity of the recovered magnesium oxide.

Accordingly, in the present disclosure, washing was performed to exclude impurities included in the electrolysis by-products. The washing is performed on a predetermined weight of the electrolysis by-products by a process of dissolving impurities such as sodium chloride (NaCl) included in the electrolysis by-products using deionized water or washing water equivalent thereto.

The washed electrolysis by-products are filtered to remove the impurities, and the solid components are dried (S130).

For the mixture of the electrolysis by-products gone through the washing and the washing water, the impurity-dissolved washing water and the solid components are separated. The solid components are separated through vacuum filtration.

The solid components separated through vacuum filtration are dried in a preset environment. The solid components may be dried for 1 hour to 12 hours under an environment of a temperature of 80° C. to 120° C., and are more preferably dried for 1 hour to within 2 hours at a temperature of 105° C.

The dried solid components of the electrolysis by-products are calcined under a preset temperature condition (S140).

The remaining volatile components are removed from the solid components of the electrolysis by-products from which impurities are first removed while going through the calcination process.

Particularly, the magnesium component present in the form of magnesium hydroxide ($Mg(OH)_2$) among the solid components is formed into magnesium oxide (MgO) by a reaction formula as follows while going through the calcining.

$$Mg(OH)_2 \rightarrow MgO + H_2O \text{[Chemical Equation 1]}$$

A calcination condition for recovering magnesium oxide through heat treatment is reported to affect reactivity, porosity, surface area and the like of recovered magnesium oxide. Calcination of a magnesium component forms a porous structure while moisture and carbon dioxide gas are removed in a range of 300° C. to 500° C. It is known that, in heat treatment at a high temperature of 900° C. or higher, a magnesium component is recrystallized and sintered, lowering porosity and increasing density.

However, the calcination condition for recovering magnesium oxide varies depending on the physical properties and chemical compositions of a precursor subject to calcination. In other words, temperature and time of calcination may be determined depending on the level of impurities included in the precursor or a crystal structure of the magnesium component.

In the present disclosure, the calcination process is performed by heat treating the electrolysis by-products as they are. Accordingly, temperature and time of the calcination are optimized so that other impurities present in the electrolysis by-products are removed and high purity magnesium oxide is recovered, and the results are shown in FIG. 2 and FIGS. 3A and 3B.

Figure 2:
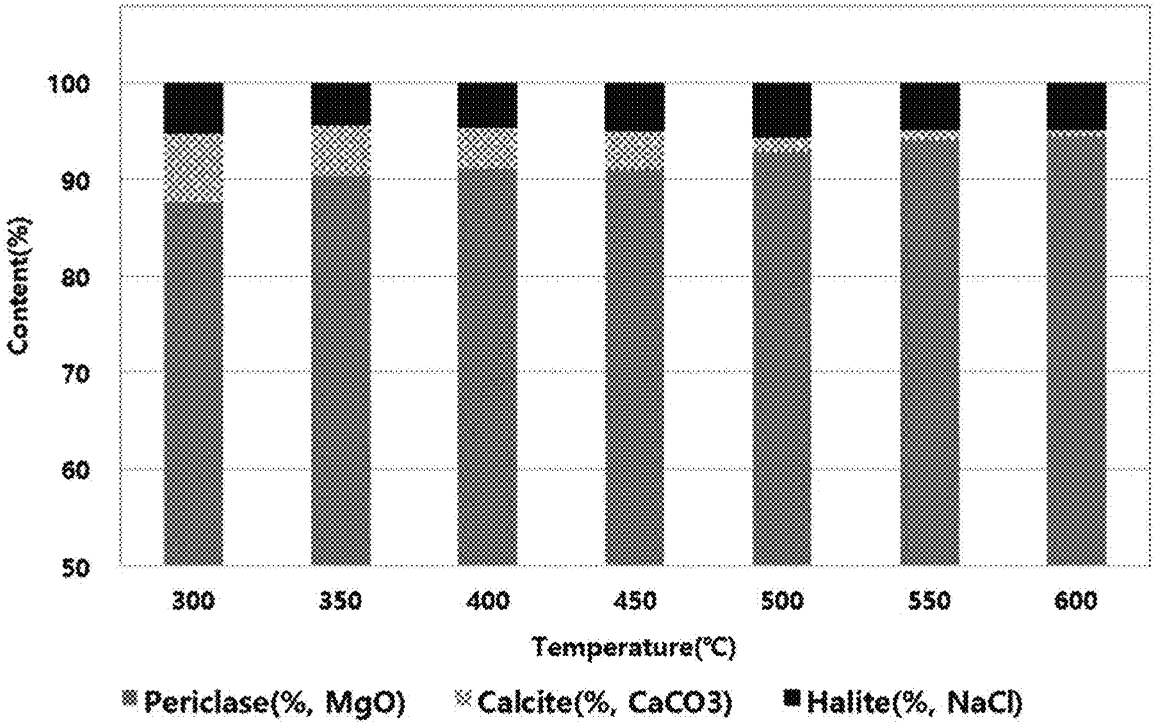
FIG. 2 is a graph showing a difference in the content of recovered magnesium oxide depending on the temperature of calcining in the method for recovering magnesium oxide according to one embodiment of the present disclosure.
Figure 3A:
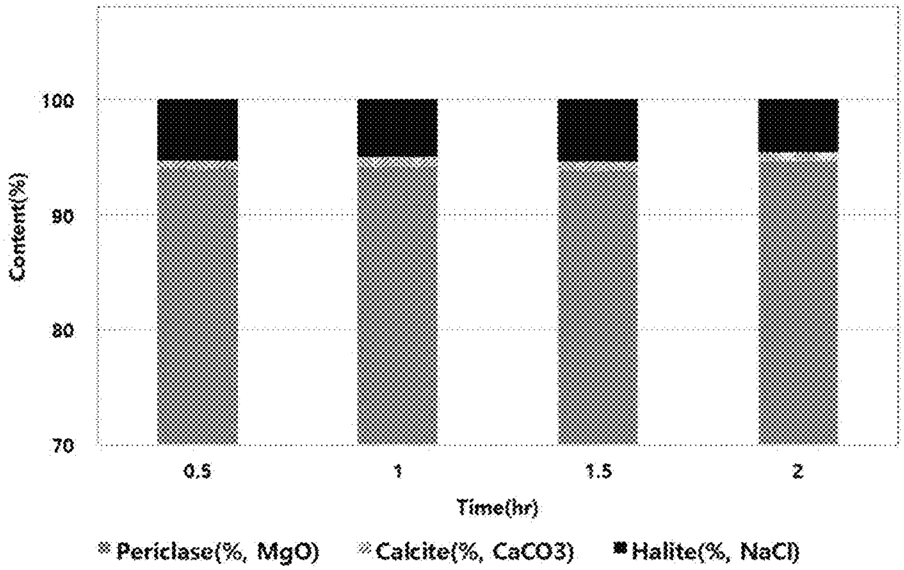
FIGS. 3A and 3B are graphs showing a difference in the content of recovered magnesium oxide depending on the heat treatment time of calcining in the method for recovering magnesium oxide according to one embodiment of the present disclosure.
Figure 3B:
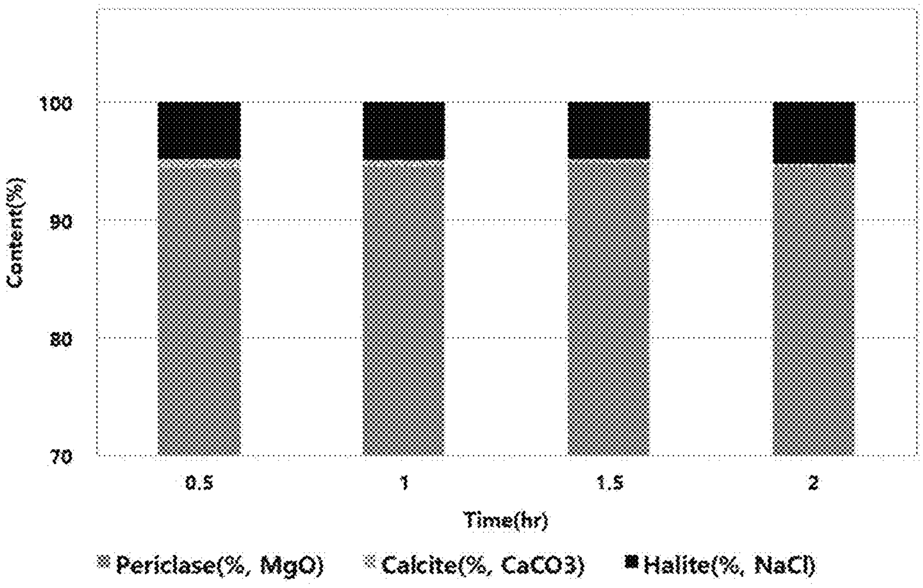

FIG. 2 is a graph showing a difference in the content of the recovered magnesium oxide depending on the temperature of the calcining in the method for recovering magnesium oxide according to one embodiment of the present disclosure.

The calcination was performed while applying the heat treatment time to 1 hour and varying the calcination temperature to a range of 300° C. to 600° C. in the calcining. Herein, the electrolysis by-products were heat treated without going through washing. In addition, for the solid completed with the calcination, the composition of the solid was measured using an X-ray diffraction analyzer (XRD).

Referring to FIG. 2, it can be identified that magnesium oxide (Periclase, MgO) having purity of at least 80% or higher is recovered when the electrolysis by-products are calcined at a temperature of 300° C. or higher.

When the electrolysis by-products are calcined, it can be seen that calcium carbonate (Calcite, $CaCO_3$) and sodium chloride (Halite, NaCl) are precipitated together in addition to magnesium oxide. However, as the calcination temperature increases, the amount of calcium carbonate decreases, and it can be seen that calcium carbonate is removed as the calcination temperature increases. As a result, purity of the recovered magnesium oxide was 87.63% when calcining at 300° C., whereas magnesium oxide having purity of 94% or higher was able to be recovered when calcining at a temperature of 550° C. or higher (550° C. MgO 94.12%, 600° C. MgO 94.55%).

Accordingly, it is considered that the optimal calcination temperature for recovering magnesium oxide from the electrolysis by-products of the present disclosure is most preferably in a range of 550° C. to 600° C.

However, unlike calcium carbonate, the precipitated amount of sodium chloride did not appear to be significantly related to the heat treatment temperature. From the results of FIG. 2, it can be identified that sodium chloride is still precipitated at a percentage of about 4.9% even under the calcination condition of 600° C.

FIGS. 3A and 3B are graphs showing a difference in the content of the recovered magnesium oxide depending on the heat treatment time of the calcining in the method for recovering magnesium oxide according to one embodiment of the present disclosure.

FIG. 3A shows the result of performing the calcining at 550° C., and FIG. 3B shows the result of performing the calcining at 600° C. Herein, the electrolysis by-products were calcined without going through washing in the same manner as in FIG. 2, and the heat treatment time was changed in 30 minute increments in the range of 0.5 hours to 2 hours.

Referring to FIGS. 3A and 3B, it can be seen that purity of the recovered magnesium oxide does not show a constant trend depending on the heat treatment time. It can be identified that purity of the magnesium oxide somewhat increases when calcining at 600° C. compared when calcining at 550° C. However, it is considered that the heat treatment time does not have a significant effect on removing impurities such as calcium carbonate and sodium chloride.

Considering the amount of energy consumed in the calcination process, the heat treatment time for recovering magnesium oxide from the electrolysis by-products is considered to be preferably from 0.5 hours to within 1 hour.

Ultimately, the calcining for recovering magnesium oxide from the by-products generated in the electrolytic chlorine generation system of the present disclosure is preferably performed for 0.5 hours to 1 hour in the temperature range of 550° C. to 600° C.

Referring to FIG. 1 again, magnesium oxide is recovered when the calcination is completed (S150).

The by-products generated in the electrolytic chlorine generation system have internal impurities removed by going through the steps of S110 to S150 described above, and as the magnesium component present in the by-products is precipitated as magnesium oxide by the calcination, magnesium oxide having purity of at least 94% or higher may be recovered from the electrolysis by-products.

The method for recovering magnesium oxide according to one embodiment of the present disclosure is capable of recovering magnesium oxide just by heat treating, that is, calcining the generated by-products without going through separate processes of crushing/grinding the electrolysis by-products and synthesizing using chemicals.

In other words, in terms of including calcination treatment only, the present disclosure has an advantage of improving process efficiency by significantly shortening existing processing/synthesizing steps for recovering magnesium oxide.

In addition, the method for recovering magnesium oxide of the present disclosure optimizes the calcination condition so that magnesium oxide is precipitated just with calcination treatment for a short period of time in a relatively low temperature range. As a result, energy consumption may be reduced compared to existing manufacturing processes of magnesium oxide processed by calcining or sintering treatment.

As described in FIG. 2 and FIG. 3, it was identified that, when the electrolysis by-products were calcined by going through only the drying process without performing the washing of S120, magnesium oxide having purity of at least 94% or higher was able to be recovered. From optimizing the heat treatment temperature in the calcining, the calcium carbonate component in the electrolysis by-products may be further removed, improving purity of the magnesium oxide, however, it was identified that about 4% to 5% of sodium chloride was still present as an impurity.

Accordingly, hereinafter, it will be described in more detail whether purity of the magnesium oxide recovered from the electrolysis by-products is improved depending on the inclusion of the washing and the order of the washing in the above-described method for recovering magnesium oxide.

Figure 4:
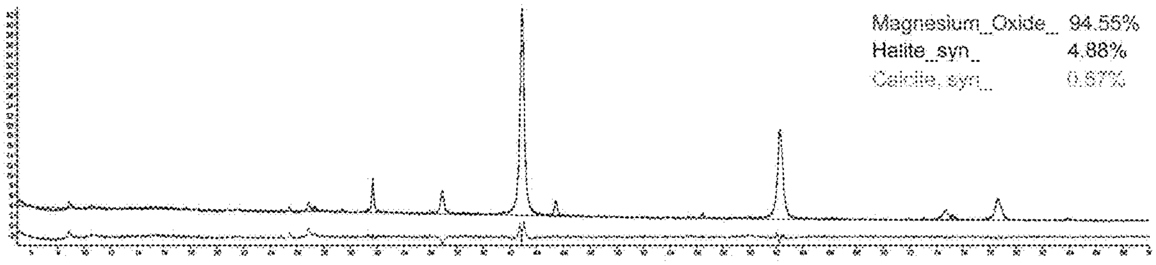
FIG. 4 is a graph showing a result of an X-ray diffraction analyzer (XRD) for a solid prepared when washing is not performed in the method for recovering magnesium oxide from by-products of an electrolytic chlorine generation system of the present disclosure.

FIG. 4 is a graph showing the analysis result of an X-ray diffraction analyzer (XRD) for the solid prepared when washing is not performed in the method for recovering magnesium oxide from the by-products of the electrolytic chlorine generation system of the present disclosure.

The calcining was performed for 1 hour at a temperature of 600° C., and the electrolysis by-products were calcined after only going through the drying process without performing the washing. Referring to FIG. 4, the solid obtained by calcining the electrolysis by-products without going through the washing of S120 was formed with magnesium oxide, sodium chloride (Halite) and calcium carbonate (Calcite), and it can be identified that purity of the recovered magnesium oxide is 94.55%.

Figure 5:
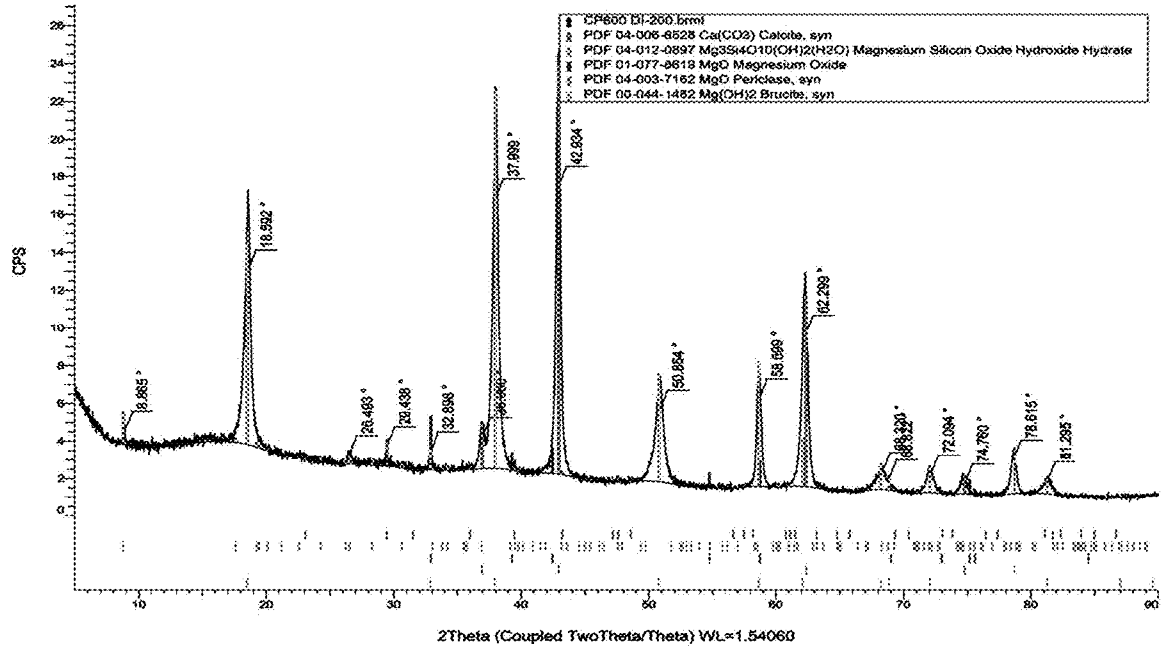
FIG. 5 is a graph showing a result of an X-ray diffraction analyzer (XRD) for a solid prepared when the order of washing is changed in the method for recovering magnesium oxide from by-products of an electrolytic chlorine generation system of the present disclosure.

FIG. 5 is a graph showing the analysis result of an XRD for the solid prepared when the order of washing is changed in the method for recovering magnesium oxide from the by-products of the electrolytic chlorine generation system of the present disclosure.

In order to identify whether the washing process using deionized water is capable of reducing the content of sodium chloride remaining in the finally recovered solid, the washing process was performed on the solid obtained by calcining the electrolysis by-products.

Herein, 0.6 g of the solid obtained by calcining the electrolysis by-products was washed with 200 ml of deionized water (DI water), and the result was dried for 1 hour to 2 hours at a temperature of 105° C., and XRD was measured to analyze the crystal structure.

Referring to FIG. 5, it can be identified that calcium carbonate (Calcite) and various forms of magnesium components are present in the solid that has undergone the washing process after calcination. Table 3 shows a content ratio for each component calculated from the XRD peaks of FIG. 5.

TABLE 3

| Component | Content (wt %) |
|---|---|
| Magnesium Hydroxide (Brucite, $Mg(OH)_2$) | 63.137 |
| Magnesium Oxide (Periclase, MgO) | 34.963 |
| Magnesium Oxide (MgO) | 0.751 |
| Other Magnesium etc. | 0.332 |
| Calcium Carbonate (Calcite, $CaCO_3$) | 0.817 |
| Total | 100.000 |

As a result of performing the washing process after calcining the electrolysis by-products, it can be identified that the finally recovered solid does not include a sodium chloride component. This means that sodium chloride, an impurity remaining in the recovered solid when only calcination treatment is performed, is able to be removed by washing that uses deionized water.

Meanwhile, purity of the magnesium is 99.183%, and it can be seen that purity may also be improved compared to when the washing is not performed. However, as for the recovered magnesium component, the content of magnesium hydroxide ($Mg(OH)_2$) appeared to be 63.137% rather than magnesium oxide, and this may be interpreted as a result of the magnesium oxide component precipitated in the calcining being rehydrated by the subsequent washing process.

Figure 6A:
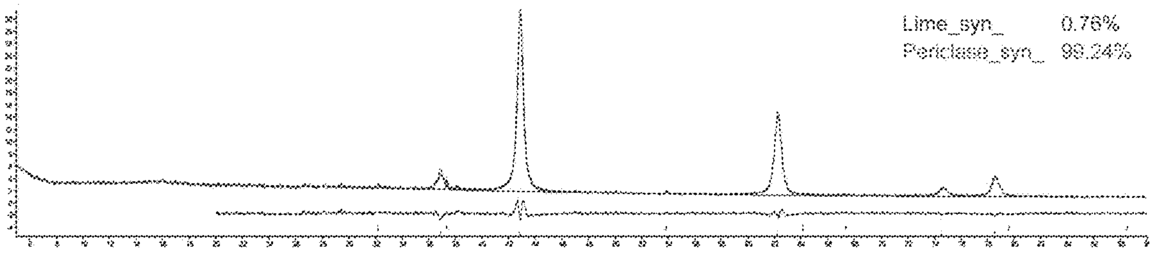
FIGS. 6A and 6B are graphs showing a result of an X-ray diffraction analyzer (XRD) for a solid prepared in the method for recovering magnesium oxide from by-products of an electrolytic chlorine generation system according to one embodiment of the present disclosure.
Figure 6B:
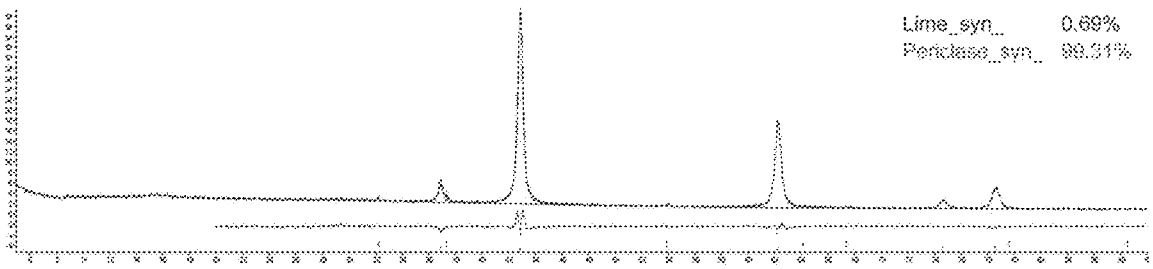

Accordingly, in the present disclosure, the washing for removing impurities is applied before calcining the electrolysis by-products to prevent hydration of the precipitated magnesium oxide, and the results are shown in FIGS. 6A and 6B.

FIGS. 6A and 6B are graphs showing the analysis result of an XRD for the solid prepared in the method for recovering magnesium oxide from the by-products of the electrolytic chlorine generation system according to one embodiment of the present disclosure.

FIG. 6A shows the XRD analysis result for the solid obtained by performing calcination for 1 hour at 550° C., and FIG. 6B shows the analysis result for the solid obtained by performing calcination for 1 hour at 600° C.

As described above, the washing process was performed before introducing the electrolysis by-products into the calcining.

The washing process was performed so that, for example, 0.6 g of the electrolysis by-products were introduced to 200 ml of deionized water (DI water) to elute impurities including sodium chloride into washing water, and the by-product-introduced washing water was subject to vacuum filtration to separate the solid from the impurity-eluted washing water. The separated solid was dried for 1 hour at 105° C., and then calcined for 1 hour at a preset temperature.

TABLE 4

| Component | Calcination Treatment at 550° C. Content (%) | Calcination Treatment at 600° C. Content (%) |
|---|---|---|
| Magnesium Oxide (MgO) | 99.237 | 99.310 |
| Calcium Oxide (Lime, CaO) | 0.763 | 0.690 |
| Total | 100.000 | 100.000 |

Referring to FIGS. 6A and 6B, it can be identified that the finally recovered solid when calcining the by-products after washing is formed only with magnesium oxide and calcium oxide. In addition, the content of the magnesium component shown in Table 4 appears to be 99.2% or greater of magnesium oxide, and it can be seen that magnesium oxide is able to be recovered with significantly higher purity compared when washing is skipped or washing is performed after calcination.

As examined above, in the present disclosure, magnesium oxide, an industrially useful resource, is able to be recovered with purity of at least 99.2% or higher from by-products generated in an electrolytic chlorine generation system using seawater or brine.

Particularly, unlike existing methods for recovering magnesium oxide based on seawater/brine, the recovery method of the present disclosure does not use chemicals at all, and therefore, economic efficiency may be improved by reducing costs required for using a large amount of chemicals and disposing the chemicals after use.

In addition, the present disclosure uses by-products generated in an electrolytic chlorine generation system used in power plants, ships and the like, and therefore, has advantages of not only reducing the amount of industrial waste generated and recovering valuable resources from the waste.

Magnesium oxide recovered in this way may be used in various industrial fields such as, in addition to ceramic raw materials, inorganic fillers, catalysts, adsorbents, cement and positive electrode active materials for secondary batteries.

In FIG. 1, it is described that each process is sequentially performed, however, this is just an illustrative explanation on the technical idea of one embodiment of the present disclosure. In other words, those skilled in the art may make various modifications and changes such as changing the order of the processes described in each drawing or performing one or more of the processes in parallel without departing from essential characteristics of one embodiment of the present disclosure, and therefore, FIG. 1 is not limited to a time sequential order.

The above description is just an illustrative explanation on the technical idea of the present embodiment, and those skilled in the art may make various modifications and changes without departing from essential characteristics of the present embodiment. Accordingly, the present embodiments are to explain the technical idea of the present embodiment rather than limiting the technical idea of the present embodiment, and the scope of technical idea of the present embodiment is not limited by such embodiments. The scope of protection of the present embodiment needs to be interpreted in accordance with the claims, and all technical ideas within an equivalent scope thereto need to be interpreted as being included in the scope of right of the present embodiment.

What is claimed is:

1. A method for recovering magnesium from by-products generated in an electrolytic chlorine generation system, the method comprising:

receiving and drying the by-products that are solid precipitates generated during electrolysis using seawater or brackish water and in which a magnesium component is present in the form of magnesium hydroxide ($Mg(OH)_2$) at a temperature of 80° C. to 120° C. for 1 hour to 12 hours; and recovering magnesium oxide (MgO) by calcining the dried by-products in a preset environment, wherein the preset environment in which the calcining is performed is maintained at a temperature of 550° C. to 600° C. for 0.5 hours to 1 hour, and wherein a purity of the magnesium recovered through the calcining is at least 94%.

2. The method of claim 1, further comprising washing the by-products, wherein the washing of the by-products is performed prior to the drying.

3. The method of claim 2, wherein the magnesium recovered through the calcining is magnesium oxide (MgO), and purity of the magnesium oxide is at least 99% or higher.

* * * * *